United States Patent
Shiokawa et al.

(10) Patent No.: US 6,860,487 B2
(45) Date of Patent: Mar. 1, 2005

(54) INSERTABLE GASKET AND INSERTING STRUCTURE

(75) Inventors: Makoto Shiokawa, Saitama (JP); Naoki Hiromasa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/669,012

(22) Filed: Sep. 24, 2003

(65) Prior Publication Data

US 2004/0056431 A1 Mar. 25, 2004

(30) Foreign Application Priority Data

Sep. 24, 2002 (JP) ........................................ 2002-276771

(51) Int. Cl.⁷ ............................................. F16L 17/025
(52) U.S. Cl. ...................... 277/607; 277/626; 277/627; 277/644; 285/329
(58) Field of Search ................................ 277/607, 612, 277/615, 616, 626, 627, 644; 285/187, 329, 330, 374, 903, 321

(56) References Cited

U.S. PATENT DOCUMENTS

| 1,840,312 | A | | 1/1932 | Dunmire | |
| 3,088,758 | A | * | 5/1963 | Chilton | 285/187 |
| 3,893,720 | A | * | 7/1975 | Moebius | 285/187 |
| 3,913,928 | A | * | 10/1975 | Yamaguchi | 277/604 |
| 4,457,523 | A | | 7/1984 | Halling et al. | |
| 4,597,596 | A | * | 7/1986 | Tozer | 285/187 |
| 5,577,742 | A | * | 11/1996 | Nicholson et al. | 277/412 |
| 5,799,954 | A | | 9/1998 | Layer | |
| 6,220,605 | B1 | * | 4/2001 | Becker, Jr. | 277/591 |
| 6,457,718 | B1 | * | 10/2002 | Quesada | 277/314 |

FOREIGN PATENT DOCUMENTS

| EP | 1 111 213 A1 | 6/2001 |
| JP | 62-220770 | 9/1987 |
| JP | 07-113469 | 5/1995 |
| JP | 11-013887 | 6/1997 |

* cited by examiner

Primary Examiner—Alison K. Pickard
(74) Attorney, Agent, or Firm—Arent Fox PLLC

(57) ABSTRACT

An insertable gasket is made of a substantially cylindrical heat resistant metal and is formed into a configuration having raised and recessed portions formed continuously and alternately as viewed longitudinally and cross-sectionally.

6 Claims, 1 Drawing Sheet

INSERTABLE GASKET AND INSERTING STRUCTURE

BACKGROUND OF THE INVENTION

The present invention relates to an insertable gasket formed from a heat resistant metal and an inserting structure utilizing the insertable gasket, and more particularly to an insertable gasket in which superior spring properties and resistance to permanent set are realized and an inserting flange structure in which superior sealing properties are realized.

A connecting member for connecting exhaust pipes used on an automobile together is made by pressing expanded graphite particles around a wire mesh used as a core material (for example, refer to Patent Literature No. 1). In addition, there is proposed a connecting member in which a metallic reinforcement layer and soft layers comprising expanded graphite sheets provided on inner and outer layer surfaces of the metallic reinforcement layer are formed into cylindrical bodies to thereby improve the sealing properties of the connecting member (for example, refer to Patent Literature No. 2).
[Patent Literature No. 1]
The Unexamined Japanese Patent Application Publication No. Sho62-220770 (pages 7, 8, and FIG. 3)
[Patent Literature No. 2]
The Unexamined Japanese Patent Application Publication No. Hei7-113469 (page 3, and FIG. 1)

Since an insertable gasket described in the Japanese Patent Application Publication No. Hei11-13887, however, employs a soft layer comprising an expanded graphite sheet as part thereof, there is caused a problem that the insertable gasket lacks the spring properties and, moreover, cannot exhibit the resistance to permanent set when used at higher temperatures. Due to this, in the event that, for example, exhaust pipes of an automobile are connected together using the insertable gasket, no superior sealing effect cannot be realized between the pipes because of the lack of the spring properties and resistance to permanent set. Consequently, there are requests for development of insertable gaskets having superior spring properties and sufficient resistance to permanent set which is exhibited when used at higher temperatures.

SUMMARY OF THE INVENTION

The invention is made in view of the requests, and an object thereof is to provide an insertable gasket having superior spring properties and sufficient resistance to permanent set which is exhibited when used at higher temperatures, and an inserting structure employing the insertable gasket which can exhibit superior sealing properties.

An insertable gasket according to the invention is formed of a substantially cylindrical heat-resistant metal and has a configuration comprising raised and recessed portions formed continuously and alternately as viewed longitudinally cross-sectionally.

The insertable gasket according to the invention is formed only of a metal and uses no expanded graphite sheet which is used in the related art and has the configuration comprising raised and recessed portions formed continuously and alternately as viewed longitudinally cross-sectionally. Due to this, in the event that this insertable gasket is interposed between an inner pipe and an outer pipe, the insertable gasket can sufficiently be deformed in a radial direction through deformation of the raised and recessed portions. Consequently, the insertable gasket according to the invention possesses sufficient spring properties. In addition, since it is entirely formed of a heat resistant metal, the insertable gasket of the invention can exhibit superior resistance to permanent set when used at higher temperatures.

The insertable gasket as set forth above desirably comprises a protruding portion which protrudes radially inwardly at an end to be inserted. In the invention, when the inner pipe and the outer pipe are connected together, the protruding portion which protrudes radially inwardly at the end of the insertable gasket that is to be inserted is hooked in advance on one end of the inner pipe, and the inner pipe and the insertable gasket can be inserted into the outer pipe as a unit when the inner pipe is inserted into the outer pipe. Thus, in the event that the inner pipe and the insertable gasket are inserted into the outer pipe, even if the insertable gasket is subjected to a contact resistance exerted by an inner circumferential surface of the outer pipe, there is no case where the insertable gasket is dislocated from the inner pipe, and hence a desired insertion can be realized. Consequently, according to the invention, the disposition of the insertable gasket between the inner and outer pipes can be ensured. In addition, when the inner pipe and the insertable gasket are inserted into the outer pipe, the insertable gasket is extended in the inserting direction by virtue of a friction resistance resulting between the insertable gasket and the outer pipe, whereby the insertable gasket contracts diametrically, so that the friction resistance against the outer pipe is reduced, thereby making it possible to smoothly insert the insertable gasket into the outer pipe.

In addition, the insertable gasket desirably comprises a flange which protrudes radially outwardly at an opposite end to the end to be inserted.

In the invention, when the inner pipe and the outer pipe are connected together, the flange which protrudes radially outwardly at the opposite end to the end to be inserted functions as a stopper. Consequently, the insertable gasket can be interposed at a desired position between the inner pipe and the outer pipe. In addition, when the inner pipe and the insertable gasket are withdrawn from the outer pipe, a tool can be hooked on the flange to enable the withdrawing operation. Furthermore, as this occurs, the insertable gasket is extended in the withdrawing direction, whereby the insertable gasket contracts diametrically, so that the friction resistance against the outer pipe is reduced, thereby making it possible to smoothly withdraw the insertable gasket together with the inner pipe from the outer pipe.

Next, an inserting structure according to the invention has an inner pipe and an outer pipe formed of a material having a thermal expansion coefficient which is smaller than that of the inner pipe, with an insertable gasket being interposed between the pipes, the insertable gasket being formed of a substantially cylindrical heat-resistant metal and having a configuration comprising raised and recessed portions formed continuously and alternately as viewed longitudinally cross-sectionally. In the inserting structure according to the invention, when used at higher temperatures, a pipe expanding action is generated in the insertable gasket which is attributed not only to the thermal expansion of the insertable gasket itself but also to the thermal expansion of the inner pipe, whereby the insertable gasket attempts to expand radially. However, the radial pipe expanding action of the insertable gasket is suppressed by setting the thermal expansion coefficient of the outer pipe smaller than that f the inner pipe. On the other hand, the insertable gasket has the configuration comprising the raised and recessed portions formed continuously and alternately as viewed longitudinally cross-sectionally, and when the pipe expanding action thereof is restricted by an inner circumference of the outer pipe, the deformation direction of the insertable gasket is changed such that the insertable gasket extends in the inserting direction thereof while maintaining the same outside diameter. As a result, the insertable gasket is appropriately compressed within a gap between the outer pipe and the inner pipe, whereby desired sealing properties can be secured, and the deformation of and damage to the inner pipe and the outer pipe can be prevented that would be caused by thermal stresses.

In addition, the inserting structure according to the invention uses the insertable gasket having the superior spring properties and resistance to permanent set as is described above. Due to this, when the inner pipe and the insertable gasket are inserted into the outer pipe, the insertable gasket exhibits good follow-up properties due to the superior spring properties. In addition, a damage to the insertable gasket that would be caused when used at higher temperature can be prevented due to the superior resistance to permanent set. Consequently, the inserting structure according to the invention can exhibit the superior sealing properties that result when these effects are combined with the thermal expansion relaxing action resulting from the selection of the thermal expansion coefficients of the inner and outer pipes.

Additionally, according to the inserting structure as set forth above, since the insertable gasket has the configuration comprising raised and recessed portions formed continuously and alternately as viewed longitudinally cross-sectionally, when a force is applied which withdraws the inner pipe and the outer pipe from each other, the insertable gasket contracts in the inserting direction (axial direction). As a result, the insertable gasket expands diametrically to thereby increase the frictional resistance between the inner pipe and the outer pipe, so that the both pipes are prevented from being withdrawn from each other.

Furthermore, according to the inserting structure of the invention, materials of the inner pipe, the outer pipe and the insertable gasket are selected desirably such that a sum of an outside diameter of the inner pipe and a thickness of the insertable gasket becomes equal to or smaller than an inside diameter of the outer pipe when in use at higher temperatures. Thus, according to the inserting structure of the invention, there is caused no case from the selection of the pipe materials where cracks are generated in the outer pipe, the inner pipe and the insertable gasket at the connection between the inner and outer pipes even when used at higher temperatures. Consequently, damages to the respective members can securely be prevented while realizing the superior sealing properties.

DETAILED DESCRIPTION OF THE PREFERRED EMBODIMENTS

An insertable gasket and an inserting structure according to the invention will be described in detail below by reference to the accompanying drawings.

Figure 1:
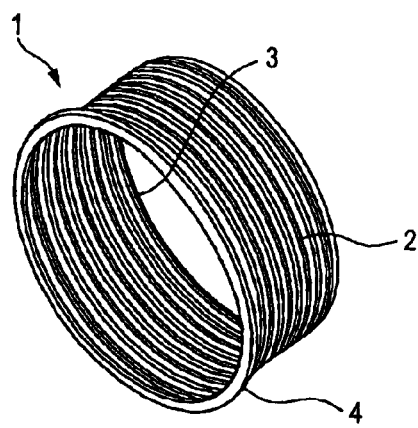
FIG. 1 is a perspective view showing an insertable gasket according to the invention.

FIG. 1 is a perspective view of an insertable gasket according to the invention. This insertable gasket is made of a heat resistant metal such as inconel and includes a main body portion 2 which is formed into a substantially cylindrical shape, a protruding portion 3 which protrudes radially inwardly at one end portion of the main body portion 2 and a flange 4 which protrudes radially outwardly at the other end portion of the main body portion 2. The main body portion 2 is formed into a configuration comprising raised portions and recessed portions formed continuously and alternately as viewed longitudinally cross-sectionally, such as a bellows configuration. Note that apart from the bellows configuration, a configuration can be adopted in which raised and recessed portions continue and alternate in circumferential and axial directions.

Figure 2A:
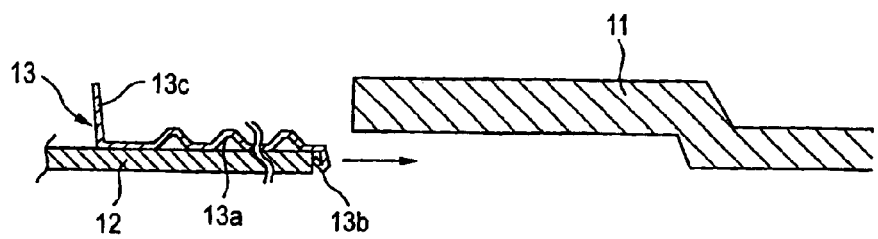
FIGS. 2A, 2B and 2C are partial sectional views sequentially illustrating modes of inserting the insertable gasket shown in FIG. 1 is inserted into an outer pipe together with an inner pipe.
Figure 2B:
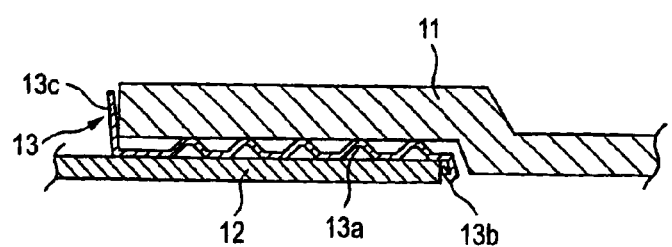
Figure 2C:
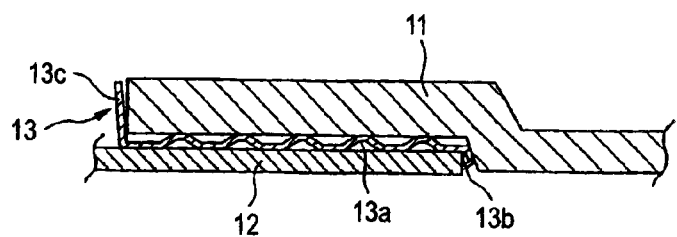

FIGS. 2A, 2B and 2C are partial sectional views illustrating modes with time in which the insertable gasket shown in FIG. 1 is disposed between an inner pipe and an outer pipe. In FIGS. 2A, 2B and 2C, reference numerals 11, 12 and 13, respectively, denote a cylindrical outer pipe, a cylindrical inner pipe that is connected to the outer pipe 11, and an insertable gasket according to the invention that is interposed between the outer pipe 11 and the inner pipe 12. As is described above, the insertable gasket 13 includes a main body portion 13a and a protruding portion 13b, and the main body portion 13a is formed into a configuration having raised portions and recessed portions formed continuously and alternately as viewed longitudinally cross-sectionally. When the insertable gasket 13 is interposed between the outer pipe 11 and the inner pipe 12 on the premise that the insertable gasket is so constructed, as shown in FIG. 2A, the protruding portion 13b of the insertable gasket 13 is hooked on an end of the inner pipe 12 that is to be inserted into the outer pipe 11 in advance. Then, as shown in FIG. 2A, the inner pipe 12 and the insertable gasket 13 are inserted into the outer pipe 11 as a unit (in a direction indicated by an arrow in the figure). This inserting action is performed such that the insertable gasket 13 is not dislocated from the inner pipe 12. As shown in FIG. 2B which illustrates the following inserting mode, the flange 13c is first brought into contact with an end portion of the outer pipe 11. When the inner pipe 12 is inserted further into the outer pipe 11, the protruding portion is then brought into contact with an interior surface of the outer pipe 11, as shown in FIG. 2C, whereat the inserting action is completed. Thus, when the inner pipe 12 and the insertable gasket 13 are inserted into the outer pipe 11, the insertable gasket 13 is extended in the inserting direction by virtue of a frictional resistance resulting between the insertable gasket 13 and the outer pipe 11, whereby the insertable gasket 13 contracts diametrically to thereby reduce the frictional resistance against the outer pipe 11, so that the insertable gasket 13 can smoothly be inserted into the outer pipe 11. In addition, when the inner pipe 12 and the insertable gasket 13 are withdrawn from the outer pipe 11, an withdrawing operation is performed by hooking a tool on the flange 13c. Furthermore, in this case, the insertable gasket 13 is extended in the withdrawing direction, whereby the insertable gasket 13 contracts diametrically to thereby reduce the frictional resistance against the outer pipe 11, so that the insertable gasket 13 can smoothly be withdrawn from the outer pipe 11 together with the inner pipe 12.

As is described above, the insertable gasket 13 that is used in the inserting action is made of a metal such as inconel and the main body portion 13a thereof is formed into the configuration having raised and recessed portions formed continuously and alternately as viewed longitudinally cross-sectionally. Thus, when the insertable gasket 13 is inserted into the outer pipe 11 together with the inner pipe 12, the insertable gasket 13 can be deformed sufficiently in the radial direction through the deformation of the raised and recessed portions formed thereon. Consequently, since the insertable gasket 13 has sufficient spring properties, even if it is subjected to the frictional resistance exerted thereon from the outer pipe when inserted into the outer pipe 11 as is described above, the insertable gasket 13 can exhibit superior follow-up properties to the inner pipe 12.

Next, an inserting structure according to the invention by will be described in detail below which is formed by inserting the insertable gasket according to the invention between the inner pipe and the outer pipe.

An inserting structure according to the embodiment is shown in FIG. 2C, the inserting structure including the outer pipe 11, the inner pipe 12 and the insertable gasket 13. In this structure, in addition to the insertable gasket 13 of the invention, a material having a thermal expansion coefficient which is smaller than that of the inner pipe 12 is used for the outer pipe 11. For example, the inner pipe 12 is made of a heat resistant material (for example, inconel) that is also used for the insertable gasket 13, whereas the outer pipe 11 is made of carbon steel.

When the inserting structure that is constructed as is described above is used at higher temperatures, as shown in FIG. 2C, a pipe expanding action attributed to the thermal expansions of the insertable gasket 13 itself and the inner pipe 12 is generated in the insertable gasket 13, and the insertable gasket 13 attempts to expand diametrically. However, by setting the thermal expansion coefficient of the outer pipe 11 as described above, the pipe expanding action of the insertable gasket 13 in the diametrical direction is suppressed by the outer pipe 11. On the other hand, the main body portion 13a of the insertable gasket 13 is formed into the configuration having the raised and recessed portions formed continuously and alternately as viewed longitudinally cross-sectionally, and when the pipe expanding action is restricted by an inner circumference of the outer pipe 11, the deforming direction of the main body portion 13a is changed such that the main body portion 13a extends in the axial direction of the insertable gasket 13 while the outside diameter thereof is being maintained the same. As a result, the insertable gasket 13 is appropriately compressed within a gap between the outer pipe 11 and the inner pipe 12, whereby not only desired sealing properties can be secured but also the deformation of and damage to the outer pipe 11 and the inner pipe 12 due to thermal stresses can be prevented.

Taking into a consideration the deformation generated when used at higher temperatures as is described above, it is preferred that the insertable gasket 13 is made of an optimum material and is formed into an optimum configuration depending upon the atmosphere such as temperatures and configuration when it is used at higher temperatures. For example, materials of the outer pipe 11, the inner pipe 12 and the insertable gasket 13 are selected such that a sum of the outside diameter of the inner pipe 12 and the thickness of the insertable gasket 13 becomes equal to or lager than the inside diameter of the outer pipe 11 when used at higher temperatures, whereby there is caused no crack in the outer pipe 11, the inner pipe 12 and the insertable gasket 13 at the connection between the inner and outer pipes 12, 11 when used at higher temperatures, so that the occurrence of damage to the respective members can securely be prevented while realizing superior sealing properties. In addition, a flexible sealing mechanism can be secured by selecting a material for use for the insertable gasket 13 whose deformation generated under actually used conditions falls within the limit of elasticity of the material so selected. Furthermore, as is described above, by forming the insertable gasket 13 into such a configuration that the protruding portion 13b is provided on the insertable gasket 13 so as to be hooked on the end portion of the inner pipe 12 that is to be inserted into the outer pipe 11, in the inserting process from the inserting mode in FIG. 2B to the inserting mode in FIG. 2C, the insertable gasket 13 extends in the inserting direction and contracts diametrically, whereby the inserting capability can be improved. Due to this, an outside diameter which is larger than the inside diameter of the outer pipe 11 can be set for the insertable gasket 13, whereby a pressing action needed to secure the desired sealing performance can be provided from the initial stage of the insertion where the pipe expansion due to the thermal expansion is not yet generated.

On the other hand, when a withdrawing action is applied to the outer pipe 11 and the inner pipe 12, the insertable gasket 13 deforms in such a manner as to be pressed to contract in the withdrawing direction due to a friction resulting between the outer pipe 11 or the inner pipe 12 and itself, and as a result, the insertable gasket 13 deforms in a direction in which the outside diameter thereof is increased. Namely, there is provided a mechanism in which the more the withdrawing action is applied, the more difficult the insertable gasket 13 becomes to be withdrawn. Furthermore, even if the outer pipe 11 and the inner pipe 12 deform, if the deformation falls within a range between the top and root of ridges on the main body portion 13a of the insertable gasket 13 which result from the configuration of the main body portion 13a which has the raised and recessed portions formed continuously and alternately as viewed longitudinally cross-sectionally, the deformation so generated can be absorbed, whereby, for example, a self-centering action can be provided.

Thus, as is described heretofore, by making the insertable gasket of the substantially cylindrical heat resistant metal on which the raised and recessed patterns continuously alternate as viewed longitudinally cross-sectinally, the superior spring properties and resistance to permanent set can be realized for the insertable gasket. In addition, by constructing the inserting structure by using the insertable gasket and setting appropriately a difference in thermal expansion coefficient between the inner and outer pipes, the superior sealing properties can be realized for the inserting structure. Consequently, the invention is advantageous in that the inserting gasket and the inserting structure which are preferable for use for the exhaust pipes of the automobile can be provided.

What is claimed is:

1. An insertable gasket comprising:
   a substantially cylindrical heat-resistant metal,
   a first end, and
   a second end opposite to the first end,
   wherein the gasket includes raised and recessed portions formed continuously and alternately as viewed longitudinally cross-sectionally, and a protruding portion which protrudes radially inwardly at the first end, the protruding portion having a tail portion which extends radially outward and toward the second end.

2. The insertable gasket as set forth in claim 1, comprising:
   a flange which protrudes radially outwardly at the second end.

3. An inserting structure comprising:
   an inner pipe,
   an outer pipe formed of a material having a thermal expansion coefficient which is smaller than that of the inner pipe, and
   an insertable gasket interposed between the pipes,
   wherein the insertable gasket is formed of a substantially cylindrical heat-resistant metal, and comprises raised and recessed portions formed continuously and alternately as viewed longitudinally cross-sectionally, and a protruding portion which protrudes radially inwardly at an inserted end, the protruding portion having a tail portion which extends radially outward and toward another end opposite to the inserted end.

4. The inserting structure as set forth in claim 3, wherein the insertable gasket comprises a flange which protrudes radially outwardly at an opposite end to the end to be inserted.

5. The inserting structure as set forth in claim 3, wherein materials of the inner pipe, the outer pipe and the insertable gasket are selected such that a sum of an outside diameter of the inner pipe and a thickness of the insertable gasket is equal to or smaller than an inside diameter of the outer pipe when in use at higher temperatures.

6. The inserting structure as set forth in claim 4, wherein materials of the inner pipe, the outer pipe and the insertable gasket are selected such that a sum of an outside diameter of the inner pipe and a thickness of the insertable gasket is equal to or smaller than an inside diameter of the outer pipe when in use at higher temperatures.

* * * * *